United States Patent
Madisetti et al.

(10) Patent No.: US 9,769,213 B1
(45) Date of Patent: Sep. 19, 2017

(54) METHOD AND SYSTEM FOR SECURE DIGITAL OBJECT MANAGEMENT

(71) Applicants: Vijay K Madisetti, Johns Creek, GA (US); Arshdeep Bahga, Chandigarh (IN); Michael Richter, Larchmont, NY (US)

(72) Inventors: Vijay K Madisetti, Johns Creek, GA (US); Arshdeep Bahga, Chandigarh (IN); Michael Richter, Larchmont, NY (US)

(*) Notice: Subject to any disclaimer, the term of this patent is extended or adjusted under 35 U.S.C. 154(b) by 0 days.

(21) Appl. No.: 15/435,590

(22) Filed: Feb. 17, 2017

Related U.S. Application Data

(60) Provisional application No. 62/389,190, filed on Feb. 19, 2016.

(51) Int. Cl.
   *H04L 29/06* (2006.01)

(52) U.S. Cl.
   CPC .......... *H04L 63/20* (2013.01); *H04L 63/10* (2013.01); *H04L 63/1425* (2013.01)

(58) Field of Classification Search
   CPC ..................................................... H04L 63/20
   USPC ............................................................ 726/1
   See application file for complete search history.

(56) References Cited

U.S. PATENT DOCUMENTS

| | | | |
|---|---|---|---|
| 8,613,080 B2* | 12/2013 | Wysopal | G06F 11/3612 726/19 |
| 2017/0039379 A1* | 2/2017 | Skipper | G06F 21/6209 |

* cited by examiner

*Primary Examiner* — Longbit Chai
(74) *Attorney, Agent, or Firm* — William Harding; Mark Malek; Widerman Malek, PL

(57) ABSTRACT

A system and method for secure data object management system comprising a cloud-based host environment and a local secure container. The cloud-based host environment creates a controlled digital object from a master digital object, and activates a tether associated with the controlled digital object. The tether includes an access permission, and optionally an operation permission (e.g., view, delete, store, edit, and copy) and a command (e.g., timeout, destroy). The controlled digital object is stored to an isolated storage of the secure container. The tether contents control access and manipulation of the controlled digital object. Certain conditions (e.g., timeout period reached, anomalous data access pattern detected), cause the controlled digital object to be destroyed and/or the tether to be inactivated. In accordance with applicable law, the cloud-based host environment utilizes the tether to detect, identify, and/or thwart unauthorized host environments in possession of the controlled digital object.

30 Claims, 12 Drawing Sheets

| Object ID | TimeStamp | User ID | Permissions |
|---|---|---|---|
| 54321 | 2016-01-11 11:15:10 | 98765 | Read Only; Timeout: 360 min |
| 54321 | 2016-01-12 09:25:00 | 98766 | Read & Write; Timeout: 360 min |
| 54321 | 2016-01-13 10:12:09 | 98767 | Read Only; Timeout: 600 min |
| 54322 | 2016-01-16 18:21:19 | 98768 | Read & Write; Timeout: 60 min |
| 54322 | 2016-01-17 14:27:16 | 98766 | Read & Write; Timeout: 60 min |
| 54323 | 2016-01-14 15:44:33 | 98765 | Read & Write; Timeout: 300 min |
| 54324 | 2016-01-12 10:55:22 | 98765 | Read & Write; Timeout: 240 min |

FIG. 9

| Object ID | TimeStamp | User ID | Action |
|---|---|---|---|
| 54321 | 2016-01-11 11:15:10 | 98765 | Checkout |
| 54321 | 2016-01-12 09:25:00 | 98766 | Updated |
| 54321 | 2016-01-13 10:12:09 | 98767 | Checkout |
| 54322 | 2016-01-16 18:21:19 | 98768 | Shared to 97874 |
| 54322 | 2016-01-17 14:27:16 | 98766 | Updated |
| 54323 | 2016-01-14 15:44:33 | 98765 | Checkout |
| 54324 | 2016-01-12 10:55:22 | 98765 | Shared to 97876 |

FIG. 10

METHOD AND SYSTEM FOR SECURE DIGITAL OBJECT MANAGEMENT

RELATED APPLICATIONS

This application claims the benefit under 35 U.S.C. §119 (e) of U.S. Provisional Patent Application Ser. No. 62/389,190 filed on Feb. 19, 2016 and titled Method and System for Secure Digital Object and Document Management, the entire contents of which are incorporated herein by reference.

FIELD OF THE INVENTION

The present invention relates to digital object architecture (DOA) and, more specifically, to systems and methods for maintaining the confidentiality, integrity, and availability of digital objects manipulated outside of a trusted computing environment.

BACKGROUND

Protecting confidential and sensitive digital objects (for example, digitally stored and manipulated information such as software, applications. Internet of Things ("IoT") devices and endpoints, and other mechanisms that may contain information in digital form) has become increasingly challenging due to threats both internal and external to an entity that owns such digital objects. To deliver their intended value, these digital objects must remain available to be edited, shared, viewed, archived, and replicated. At the same time, the integrity of these digital objects must be maintained and their disclosure and/or loss must be prevented.

While known solutions in the art of automated document management, word processing, and information display provide basic security features such as access restrictions, authentication, authorization and encryption, such measures do not provide effective security mechanisms to prevent theft and/or copying of digital objects by insiders (i.e., persons and/or systems authorized to access stored objects) or by outsiders (i.e., persons and/or systems accessing these digital objects without authorization). As conducted by either an insider or an outsider, malicious leaking of digital objects may occur in the following forms:

a) Copying digital objects on a USB drive
b) Emailing digital objects to third parties
c) Uploading digital objects to a cloud storage or an FTP server not trusted by the entity to whom the digital objects belong
d) Copying the contents of a digital object and pasting those contents into a new digital object (e.g., an email)
e) Printing the contents of digital objects
f) Tampering or breaking into a hosting device and stealing storage media upon which digital objects are stored Maintaining confidentiality of information becomes even more difficult when digital objects are shared (in editable form) among multiple users authorized to work on the digital objects in a collaborative manner. Existing approaches for access control and digital object sharing do not have the flexibility to share digital objects, such as documents, for limited time duration. Once shared, known solutions allow digital objects to be accessed by the receivers without workable limits. For example, revoking access to shared digital objects is possible in solutions where a centralized or cloud-based access control and management system is used and digital objects are shared from that system. However, this approach does not prevent the receiver from saving a copy of the digital object locally, from copying the contents to a new digital object on the local machine, and/or from emailing the contents to a third party.

Known access control approaches based on Access Control Lists (ACLs) and Role-based Access Control (RBAC) systems also fail to provide an effective line of defense against leaking of digital objects by a malicious insider who has the necessary authorizations to access the digital objects, or by an outsider who illicitly gains access to the digital objects.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a method and system of protecting confidential and sensitive information stored in digital objects, such as software, applications, Internet of Things ("IoT") devices and endpoints, and other mechanisms that may contain information in digital form. In certain embodiments, the present invention may provide the following advantages:

1) Prevent loss and/or theft of digital objects due to either insiders or outsiders, and without perceptible loss of functionality relating to the digital objects. Such security includes the ability to identify at an organizational level certain threats at a particular location and/or a particular time instant or window, or both. Such security also employs patterns of access and/or usage as a library of patterns to assist in threat tracking and reaction/action based on context and threat levels.

2) Employ tracking and analytics capability within a cloud to identify behaviors involving a particular digital object over time based on activities on system-generated tethers, and also on threat location, for possible offensive action in a coordinated manner.

3) Allow proactive action with regard to threats to digital objects, including tracking of theft by insiders and/or outsiders, and also controlling destruction of a digital object prior to theft, loss, or disclosure. Both offensive and defensive approaches may be put in place through the use of analytics capabilities in the cloud.

The advantages described above are achieved by a secure data object management system, and associated methods, comprising a cloud-based host environment and a secure container on a local machine. The cloud-based host environment may create a controlled digital object from data and/or meta-data of a master digital object, and may store the master digital object to a cloud object store. The cloud-based host environment also may activate a tether associated with the controlled digital object. The tether may be adorned with at least one control condition, such as an access permission, an operation permission (e.g., view, delete, store, edit, and copy), and a command (e.g., timeout, destroy).

The secure container may receive the controlled digital object and store the controlled digital object to an isolated storage. The secure container may allow applications on the local machine to manipulate that controlled digital object only as permitted by the tether. For example, access to the controlled digital object may only be permitted upon detection of an access request satisfying the access permission of the tether. Similarly, manipulation of the controlled data object may only be permitted upon detection of an operation request satisfying the operation permission. Upon detection of certain conditions (e.g., timeout period reached, anomalous data access pattern detected), the secure container may delete the controlled digital object and/or the cloud-based host environment may sever the tether (e.g., set the state value equal to inactive, or the tether may be deleted or purged) to stop any further manipulation of the controlled data object.

BRIEF DESCRIPTION OF THE DRAWINGS

FIG. 9 is a table illustrating exemplary document access meta-data according to an embodiment of the present invention.

FIG. 10 is a table illustrating exemplary document access log records according to an embodiment of the present invention.

DETAILED DESCRIPTION OF THE INVENTION

Figure 1:
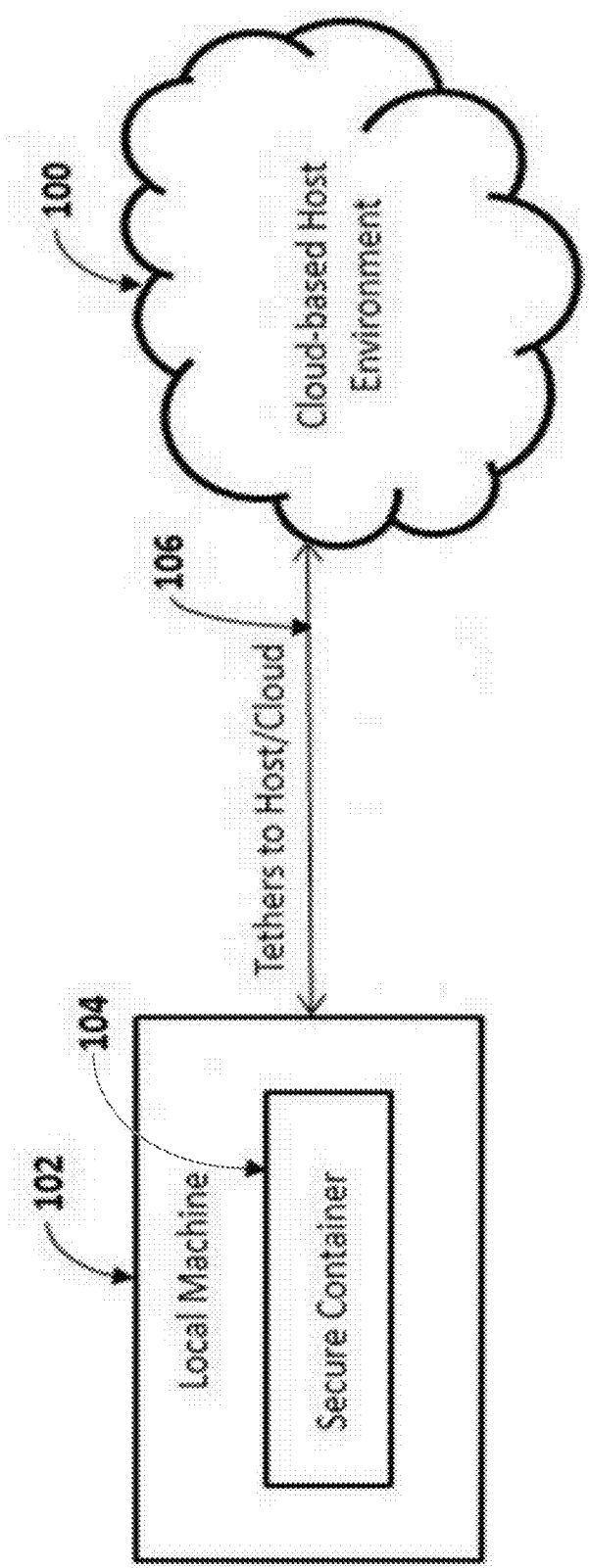
FIG. 1 is a schematic diagram of a cloud-based host environment and a secure container according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 1-15, a secure digital object management (S-DOM) system according to an embodiment of the present invention is now described in detail. Throughout this disclosure, the present invention may be referred to as a digital object management system, a digital object protection system, a DOM system, a management system, a protection system, an access control system, a device, a system, a product, and a method. Those skilled in the art will appreciate that this terminology is only illustrative and does not affect the scope of the invention.

An embodiment of the invention, as shown and described by the various figures and accompanying text, provides a system and associated methods for employing tethers between a cloud-based host environment and a secure container on a local machine to achieve secure manipulation and management of digital objects. Those skilled in the art will appreciate that the present invention contemplates the use of computer instructions and/or systems configurations that may perform any or all of the operations involved in secure digital object management. The disclosure of computer instructions collectively identified by the named subsystems described herein is not meant to be limiting in any way. Also, the disclosure of systems configurations that include the named subsystems hosted in a cloud-based host environment and in some number of local machines is not meant to be limiting in any way. Those skilled in the art will readily appreciate that stored computer instructions and/or systems configurations may be configured in any way while still accomplishing the many goals, features and advantages according to the present invention.

Referring now to FIG. 1, for example, and without limitation, a secure digital object management (S-DOM) system, according to an embodiment of the present invention, may include a cloud-based host environment 100 configured in data communication with a local machine 102 (e.g., computer, or a smartphone) that may host a secure container 104 (e.g., implemented in software). The cloud-based host environment 100 may advantageously control the creation, lifecycle and destruction of digital objects (for example, and without limitation, data artifacts such as documents, software, video, images, music, and/or IoT devices). Such digital objects may be synchronized from the host environment 100 to the secure containers 104 hosted on the local machines 102, and also may be secured such that the digital objects may not be viewed, deleted, stored, edited, or copied without permission, knowledge and control of the host environment 100. The digital objects may be stored and replicated in the cloud-based host environment 100.

Figure 2:
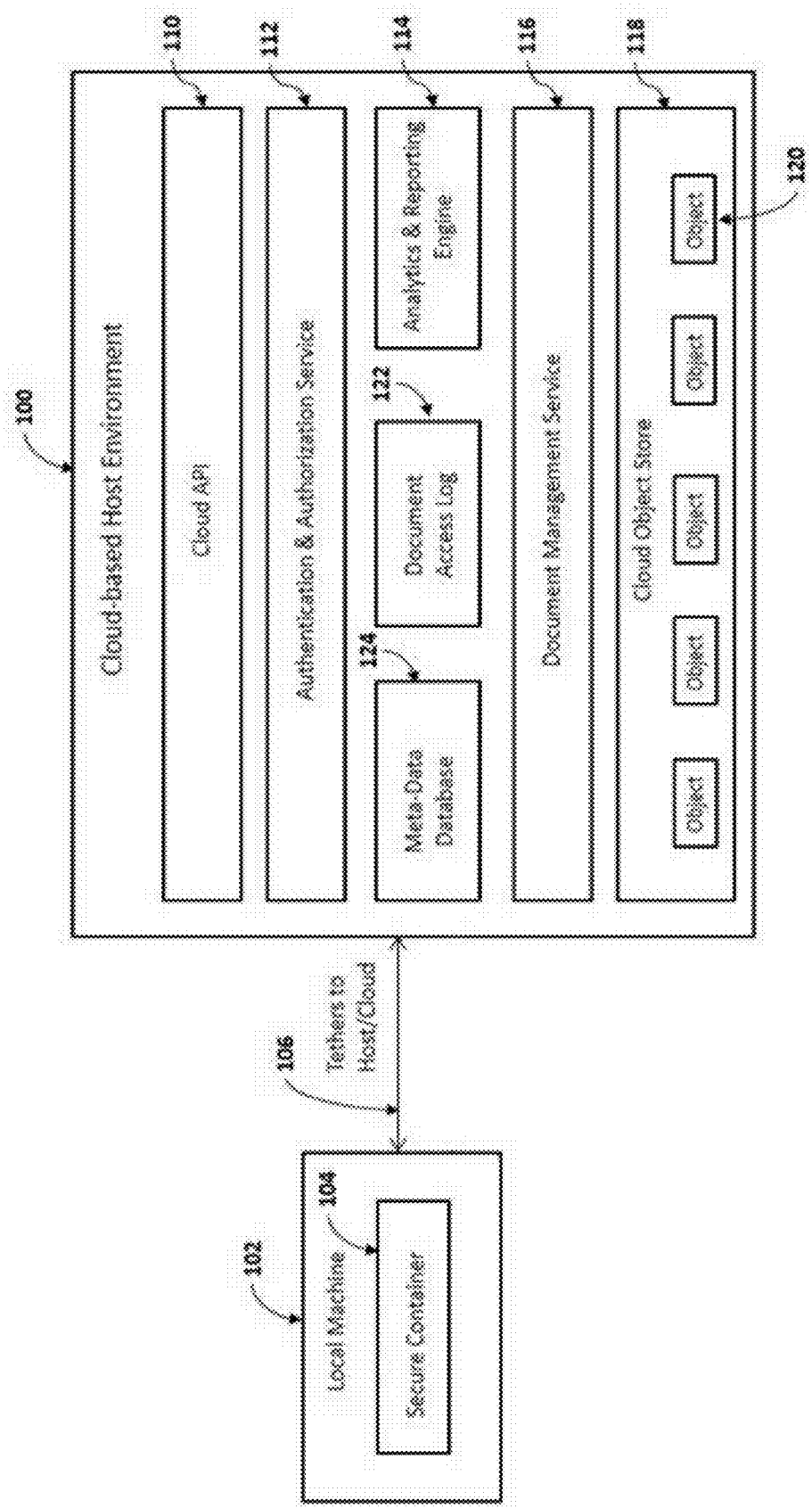
FIG. 2 is a schematic block diagram of an exemplary data analytics architecture (DAA) for the cloud-based host environment shown in FIG. 1.

Continuing to refer to FIG. 1, and referring additionally to FIG. 2, an exemplary data analytics architecture of a cloud-based host environment 100 may include a cloud-object store 118 configured for storage of master digital objects 120. For example, and without limitation, the cloud-object store 118 may be implemented as a distributed file system (DFS). A document management service 116 may advantageously control the digital objects' 120 lifecycles. A metadata database 124 within the host 100 may maintain information about the master digital objects 120 and their controlled instantiations of digital objects 212 (as described in more detail below), such as, for example, and without limitation, user IDs of the object owners, object creation timestamps, change logs recording changes in object state, transactions executed or attempted, and object permissions. An access-log 122 within the host 100 may record all digital object 120 accesses and transmissions.

The analytics and reporting engine 114 within the host 100 may employ big data tools and frameworks for batch or real-time analytics (as described in more detail below) on available databases and meta-databases, for instance, to analyze digital object access logs and network traffic and to identify anomalous data access and data transmission patterns. The host 100 may further include application programming interfaces (APIs) 110 for creating, updating, and deleting digital objects, and for operating authentication and authorization 112 and analytics and reporting 114 functions. These APIs 110 may be used for developing document management and analytics applications that operate within an organization's network. For implementing the components within the cloud-based host environment 100, microservices architectures may be used whereby each service may perform a predefined set of actions and may communicate with other services through the use of inter-service communication mechanisms such as request-response (e.g. REST over HTTP), publish-subscribe (e.g. MQTT), remote procedure call (RPC) (e.g. Thrift), or notifications. In certain embodiments of the present invention, these services may be developed, deployed and scaled independently.

In certain embodiments of the present invention, security features for advantageously providing secure access to the cloud-based host environment 100 may include one or more of the following:

1) Authorization Services: As a matter of definition, authorization refers to digitally specifying access rights to protected resources using access policies. The host 100 may include authorization services such as policy management, role management and role-based access control. A role-based access control framework may be used to provide access to master data objects 120 in the host 100 to users based on the assigned roles and data access policies. The host may support "OAuth," an open standard for authorization that allows resource owners to share their private resources stored on one site with another site without handing out the credentials.

2) Identity Management Services: Identity management services may provide consistent methods for identifying persons and maintaining associated identity attributes for users across multiple organizations. For example, and without limitation, Federated Identity Management (FidM) may be enforced for the host 100. FidM provides the ability to establish trust relationships between various security domains to enable the passing of authentication, authorization and privacy assertions.

3) Authentication Services: The host 100 may support authentication services 112 configured to prevent digital objects from being accessed by unauthorized users. For example, and without limitation, authentication and authorization services 112 may include a Single Sign On (SSO) that may enable users to access multiple applications after signing in for a first time. In addition to SSO, One Time Password (OTP) security may also be enforced. OTPs may be delivered via SMS and email. One benefit of OTP is that such security regimes are not vulnerable to replay attacks.

4) Data Encryption: The host 100 may adopt a data encryption standard such as the Advanced Encryption Standard (AES) for encrypting all data that is stored in the host. In addition to encryption of stored data, all transmission of data may be protected with Secure Socket Layer (SSL) encryption technology.

Figure 3:
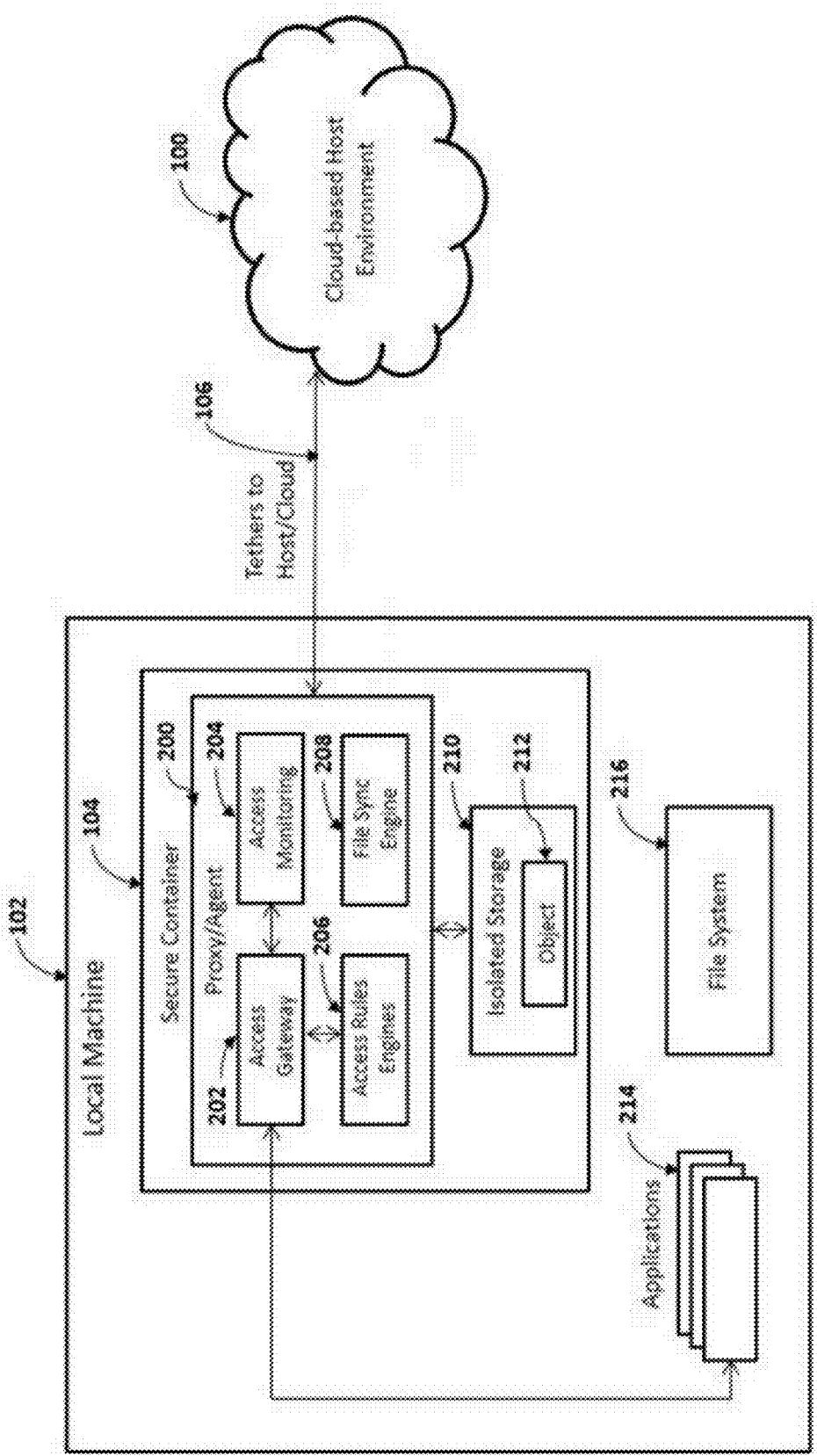
FIG. 3 is a schematic block diagram of an exemplary DAA for the secure container shown in FIG. 1.

Referring now to FIG. 3, an exemplary data analytics architecture of a secure container 104 will now be discussed in detail. A secure container 104 may advantageously control access to digital objects 212. The secure container 104 may include a secure storage system 210 that may be isolated from the unsecured file system 216 of the local machine 102. Applications 214 on the local machine 102 may be configured to access and update digital objects 212 through a proxy or agent 200 included in and operated by the secure container 104. Digital objects 212 in the secure container 104 may be tethered 106 (through a two-way connection, as described in more detail below) to the host environment 100. Tethers 106 may be established between the objects 212 and the host environment 100 through the proxy 200. Tethers 106 may advantageously allow the host 100 to control access to and manipulation of objects 212 on the secure container 104.

Access rules and allowed operations 206 for the objects 212 on the local machine 102 may be determined by the host 100 and may be enforced using the tethers 106 through the proxy 200. Use of secure containers 104 having isolated storage 210 prevents unauthorized copying of objects 212 outside the containers 104 to the local storage 216. The access monitoring component 204 in the secure container 104 may log all object accesses and status changes (and/or attempted changes) and may report to the analytics engine 114 in the cloud-based host 100 through the tether connection(s) 106. Objects 212 may be automatically synchronized between the cloud-based host 100 and the secure container 104 by the file sync engine 208. Digital objects 212 may be deleted from the container 104 after access timeouts (computed, for example, and without limitation, as a delta between an object creation timestamp and a system date/time on the local machine 102).

Continuing to refer to FIG. 3, and a referring again to FIG. 2, for example, and without limitation, the tether 106 may be implemented as an identifiable two-way data connection (e.g., bi-directional communication link using TCP, UDP, Sockets, REST or other similar network/internet protocols, for instance) between a local object 212 on the local secure container 104 and a host object 120 on the cloud-based host environment 100. Tether identification may be accomplished using a unique tether identifier. Objects 212 may be coupled/connected via software pipes (or links over a network) to the host environment 100 through tethers 106. These two-way connections 106 may be used for control of objects 212 through conveyance of control conditions such as, for example, and without limitation, data, metadata, information and/or commands. Tether connections 106 may be of various kinds, including, for example, and without limitation, a persistent connection (TCP-based), UDP-based, or based on periodic data exchanges (REST-based), over wired and/or wireless networks. Objects 212 may be assigned unique IDs (either global, or only unique within a particular state, session or time context) which the host 100 may use for tracking through the tether connections 106. Object IDs may advantageously allow the host 100 to detect which objects 212 are false based on their ID and environment, and/or which objects 212 have been moved to new environments (either authorized or unauthorized). A group of digital objects 212 (for example, and without limitation, a group of documents in a single directory) may be associated with a single tether 106.

Tethers 106 between the objects 212 in local secure containers 104 and the host 100 may be established over an organization's network or networks approved by the organization. Tethers 106 may prevent false replays or other attacks where an attacker tries to create an impression that the object 212 is in a trusted environment (e.g., that object 212 is legitimate). Still referring to FIG. 2, in a direction of data communication from the container 104 to the host 100 over the tether 106, the secure container 104 may send object access monitoring data and object status changes and/or transactions data (executed or attempted) to the host 100. The container 104 may ping the host 100 for an active connection 106 (e.g., state value of "active"). Note: Objects 212 may self-destruct or may be locked at the direction of the secure container 104 if the tether 106 breaks or times out. The secure container 104 may send application 214 requests to the host 100 to approve or deny an operation and/or to rollback a change. In a direction of data communication from the host 100 to the container 104 over the tether 106, the host 100 may transmit commands to create, synchronize, update and/or delete digital objects 212 on the container 104.

Figure 4:
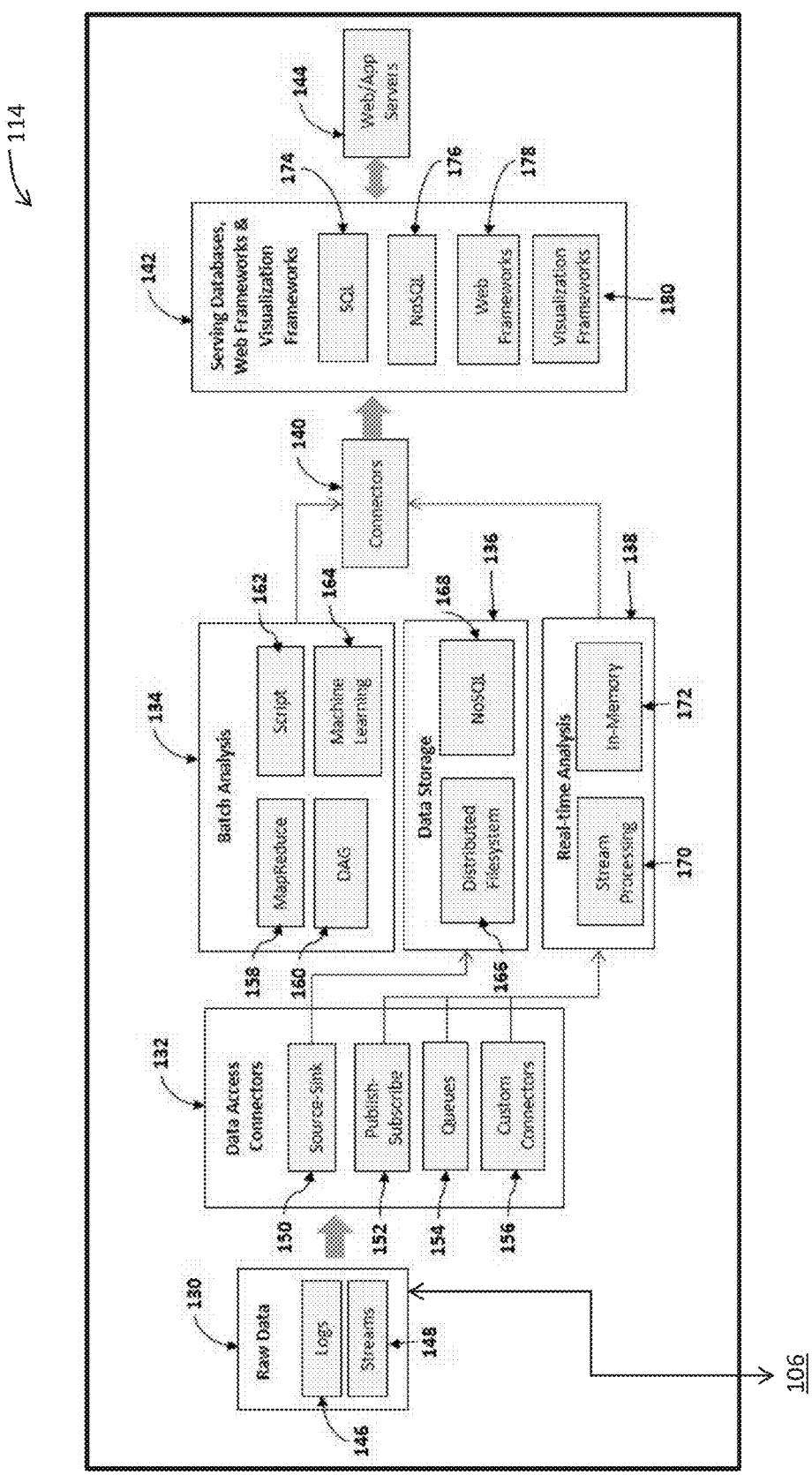
FIG. 4 is a schematic block diagram of an exemplary subsystem architecture for the analytics and reporting engine of FIG. 2.

Referring now to FIG. 4, exemplary subsystems of the analytics and reporting engine 114 of the cloud-based host environment 100 will now be discussed in detail. For example, and without limitation, an exemplary data analytics and reporting architecture may include raw data sources 130 that may comprise data access logs 146 and data streams 148 obtained from different tether connections 106. Data access connectors 132 may include tools and frameworks for collecting and ingesting data from various sources into the big data storage and analytics frameworks. In certain embodiments of the present invention, these frameworks may include source-sink connectors 150 (such as Apache Flume), publish-subscribe messaging frameworks 152 (such as Apache Kafka), database connectors 154 (such as Apache Sqoop), messaging queues (such as RabbitMQ) and custom connectors 156. A person of skill in the art will immediately recognize that the choice of the data connector may be driven by the type of data source. The data access connectors 132 may ingest data into a distributed filesystem 166 (such as HDFS) or a NoSQL database 168 (such as HBase). The data may be analyzed in batch mode or real-time mode. For batch analysis, frameworks such as MapReduce 158 (using Hadoop), scripting frameworks 162 (such as Pig), distributed acyclic graph frameworks 160 (such as Apache Spark), and machine learning frameworks 164 (such as Spark MLlib) may be used. For real-time analysis, stream processing frameworks 170 (such as Apache Storm) or in-memory processing frameworks 172 (such as Apache Spark) may be used. The analysis results may be stored by the connectors 140 either in relational 174 (SQL) or non-relational databases 176 (NoSQL). Alerting and reporting applications may be implemented using web frameworks 178 and visualization frameworks 180, and deployed on web and application servers 144 within the host environment 100.

Figure 5:
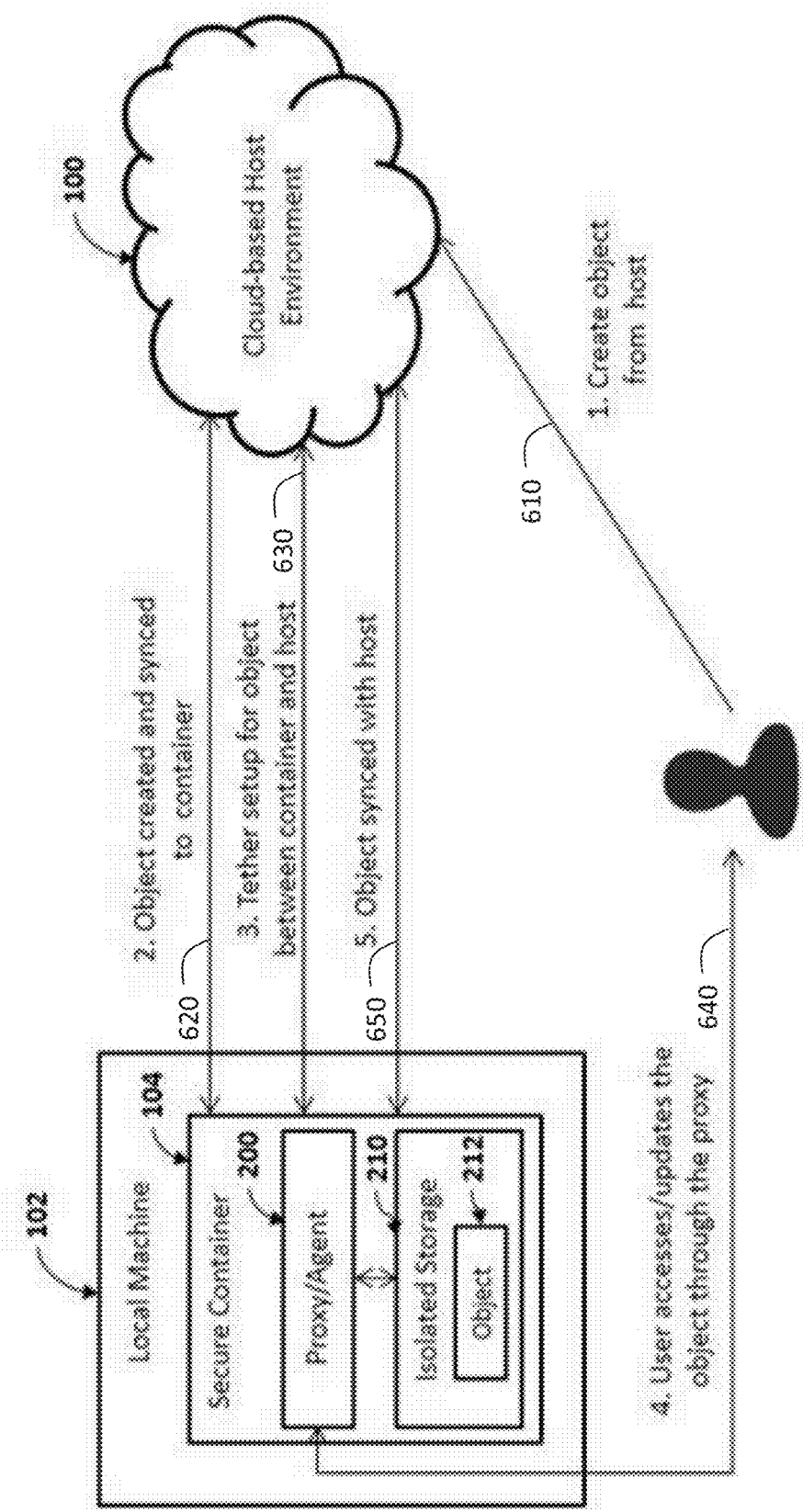
FIG. 5 is a process flow illustrating an exemplary method for digital object creation according to an embodiment of the present invention.

Referring now to FIG. 5, a method aspect of the present invention for digital object creation is described in more detail. New objects 212 may be created within the secure container 104 only through the host 100. For example, and without limitation, at Step 1 (610) a user may create a digital object 120 (referred to as a master digital object) from the host 100. At Step 2 (620), the host 100 may create and distribute to the secure container 104 a controlled digital object 212. The controlled digital object 212 may be synchronized to the master digital object 120 on the host 100. The host 100 may, at Step 3 (630), setup a tether 106 for the object 212 between the secure container 104 and the host 100. At Step 4 (640), some user may access and manipulate (e.g., update) the digital object 212 on the secure container 104 through the proxy 200. Before any operation may be performed on the object 212, a check may be performed with the host environment 100 (over the tether connection 106). Objects may only be operated on in the presence of active tethers 106 and only the allowed operations (communicated over the tether 106) may be performed. Objects 212 may be disabled or destroyed and/or changes may be rolled back by commands sent by the host 100 over the tether 106. Other commands may also be sent by the host 100 via the tether 106. For example, and without limitation, modifications made to the digital object 212 on the secure container 104 may be synchronized with the host 100 (Step 5 (650)).

Figure 6:
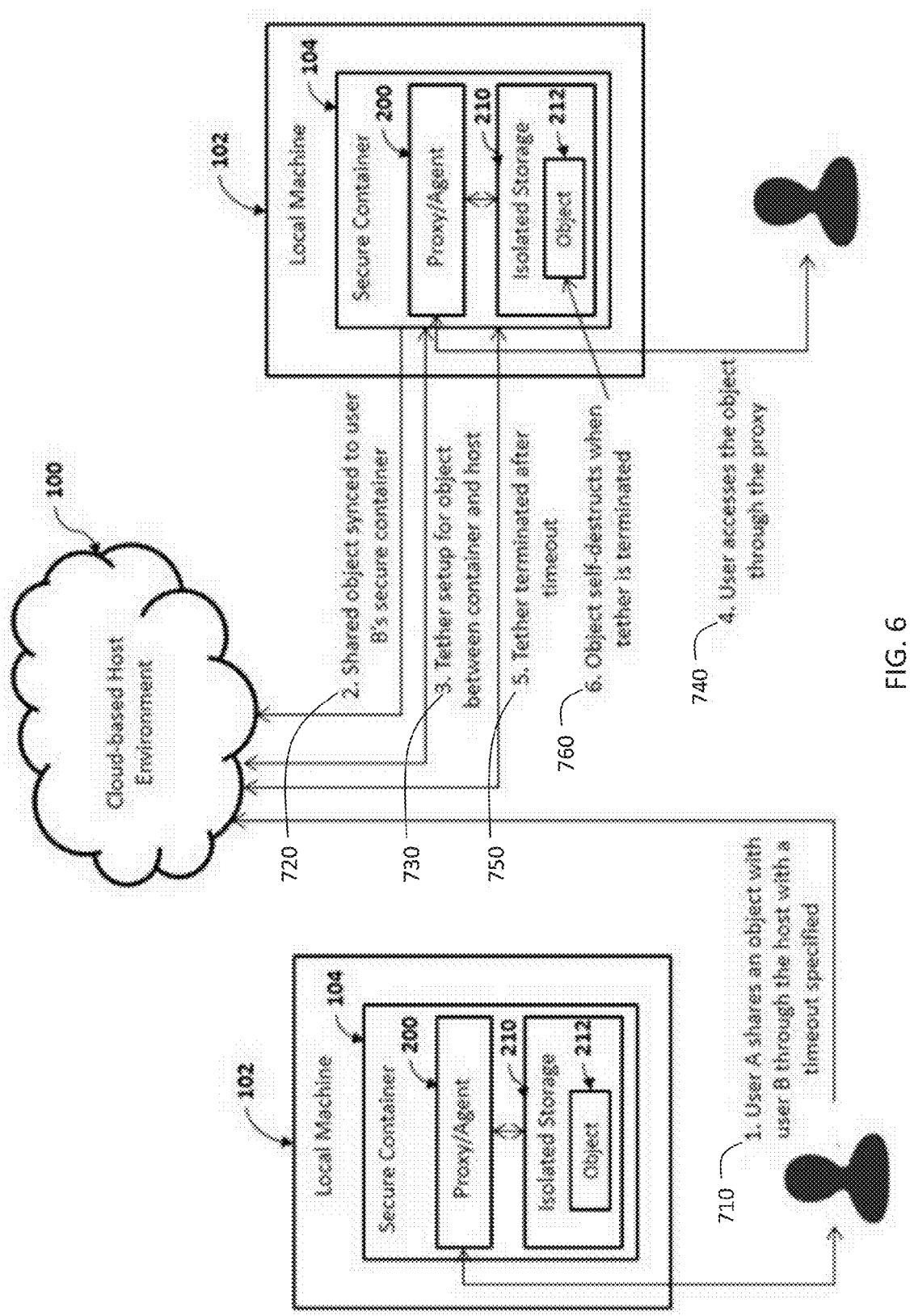
FIG. 6 is a process flow illustrating an exemplary method for digital object sharing according to an embodiment of the present invention.

Referring now to FIG. 6, a method aspect of the present invention for digital object sharing is described in more detail. From the beginning at Step 1 (710), a digital object originator and/or owner (i.e., as shown, User A) may share an artifact (for example, and without limitation, a collaboratively drafted document) with other users (i.e., as shown, User B) by employing the host 100 to control the sharing of those objects. An object owner may set access timeouts while sharing digital objects. Owners may also revoke access permissions to shared objects (e.g., not necessarily involving deletion of a particular shared digital object). When an object is shared by User A, the object 212 may be synchronized in the receiver's local secure container 104 (Step 2 (720)) and a tether 106 may be established by the host 100 for the shared object 212 between the shared container 104 and the host 100 (Step 3 (730)). As collaborating users access and modify the controlled digital object 212 through the proxy 200 (Step 4 (740)), the host 100 may manage synchronization of the digital objects 212 within users' respective local secure containers 104. If the object owner (User A) specifies a timeout period, the tether 106 may become inactive (e.g., state value of "inactive") after timeout (Step 5 (750)) and the local copies of the object 212 within the secure containers 104 of the receivers may be destroyed (Step 6 (760)). In this way, the tether 106 may advantageously prevent spoofing which seeks to allow an object 212 to continue to exist in an uncontrolled state.

Continuing to refer to FIG. 6, when a digital object 212 is shared among multiple users through the host 100, the object 212 may be synchronized with the respective secure containers 104 of each of the receivers of the object 212. For example, and without limitation, each local copy of the object 212 may have a separate tether 106 associated with it. Objects 212 may only be operated on by a user and/or an application in the presence of active tethers 106. In the absence of active tethers 106, the digital object 212 within the local secure container 104 may self-destruct after a timeout period. This measure of self-destruction in the absence of active tethers 106 may advantageously safeguard the digital objects 212 when a malicious party may break the local machine 102 and physically remove the hard drive containing the digital object 212.

Figure 7:
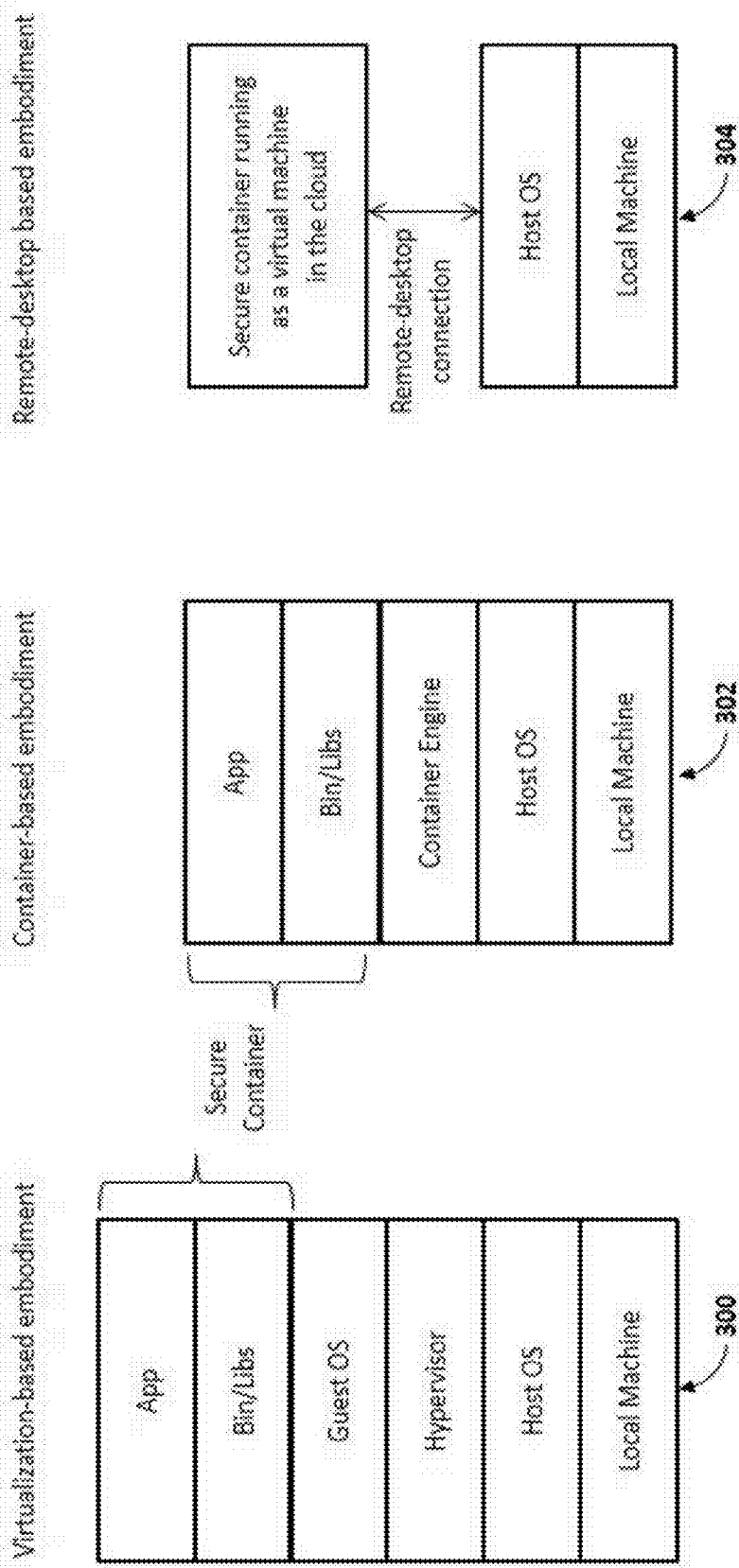
FIG. 7 is a schematic diagram of exemplary system architectures for secure containers according to certain embodiments of the present invention.

Referring now to FIG. 7, and referring additionally to FIGS. 2 and 3, exemplary deployment approaches for secure containers 104 are described in detail. For example, and without limitation, the local secure containers 104 may be deployed as described in the following embodiments:

1. Virtualization-based embodiment 300: In this approach, the secure container 104 may operate inside a virtual machine that may execute on top of a hypervisor installed in the host operating system (OS) on the local machine 102. The rendering software (such as word processing, spreadsheet application, published document viewers) may be pre-installed on the virtual machine image. The file system 210 of the virtual machine may be isolated from the file system 216 of the local machine 102.

2. Container-based embodiment 302: In this approach, the secure container 104 may operate inside a container 104 (e.g., Docker or Linux Container) that may execute on top of a container engine installed in the host OS on the local machine 102. The rendering software may be pre-installed on the container storage 210. As in the case of virtual machines, the container file storage 210 may be isolated from the local machine file system 216.

3. Remote Desktop-based embodiment 304: In this approach, the secure container 104 may operate inside a virtual machine in the cloud. The local machine 102 may establish a remote desktop connection to the virtual machine hosting the secure container 104. The rendering software may be pre-installed on the virtual machine image used for the secure container 104 instance in the cloud. Because the secure container 104 executes on separate instance, its file system 210 may be isolated from the local machine's file system 216.

Figure 8:
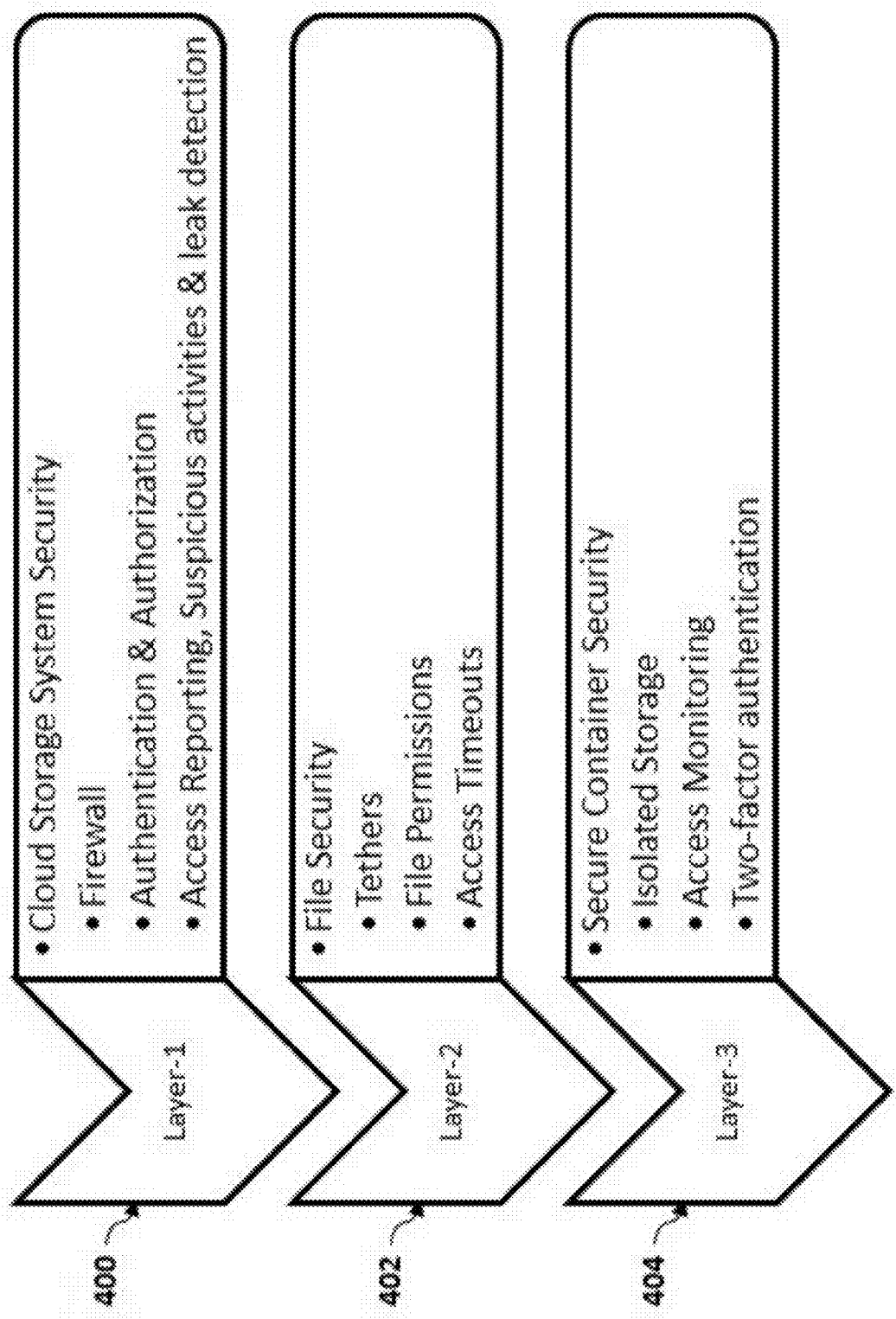
FIG. 8 is a schematic diagram of exemplary security layers according to certain embodiments of the present invention.

Referring now to FIG. 8, and continuing to refer to FIG. 2, exemplary security layers for the present invention will be discussed in detail. Layer-1 400 may relate to the security of the cloud storage system 118. The security measures in this layer may include firewalls, authentication and authorization mechanisms, reporting of accesses and transmissions of digital objects and detection of suspicious activities and intrusions through the analysis of object access logs and network traffic. Layer-2 402 may relate to the security of the file system. The security measures in this layer may include tether connections for digital objects, the use of file permissions and access logs. Layer-3 404 may relate to the security of the local secure container 104. The security measures in this layer may include isolation of the secure container storage 210 from the local machine storage 216, access monitoring for digital objects and documents and the use of two-factor authentication mechanisms to access the secure container 104. Port blocking and software restriction policies may be setup to disable any form of internet access (browsing, emails, telnet, FTP, HTTP) to prevent leaks. The only enabled network connection may be between the secure container 104 and the host environment 100 in the cloud. To access a secure container 104, a user may authenticate with the container 104 using the user's credentials. Additional security may be enforced by the use of two-factor authentication. For example, and without limitation, the second factor may be one of the following:

A) Universal Two Factor (U2F) physical security key
    B) Time-based OTP generated by an application (such as a smartphone app)
    C) NFC tags/keys that authenticate with a smartphone application Access to the objects 212 within the containers 104 may be secured by an additional layer through the use of tethers 106. Objects 212 may be accessed only in the presence of active tethers 106 and tethers 106 may be setup only in the allowed networks.

The secure containers 104 may log all the accesses to the objects 212 and the operations performed, as well as changes in status attempted or completed. The host 100 may monitor the lifecycle of tether connections 106 for all the objects 212. The analytics and reporting engine 114 in the host 100 may analyze these logs and available databases for detecting suspicious activities and intrusions.

FIG. 9 illustrates an example of digital object access meta-data 500 and FIG. 10 illustrates an example digital object access log 600. The host 100 may issue commands to the local container 104 to provide privileges (e.g., access and/or transaction priority) and/or to take action such as, for example, and without limitation, the following: delete or destroy digital objects 212, and track digital objects 212 or their environment (e.g., location, address, GPS, other sensor information in case of Internet of Things (IoT)). Tethers 106 may receive location, address information, GPS location, or other context information (e.g., proximity to other devices) from the secure container, which may have the ability to monitor its surroundings and those of users who are permitted to and/or are attempting to use the secure container's facilities. Tethers 106 may also link smartphones or other biometric devices to add to the security of the activities that are permitted. A tethered-application on an approved user's smartphone may be required to be present prior to anyone accessing or editing a digital object.

Figure 11:
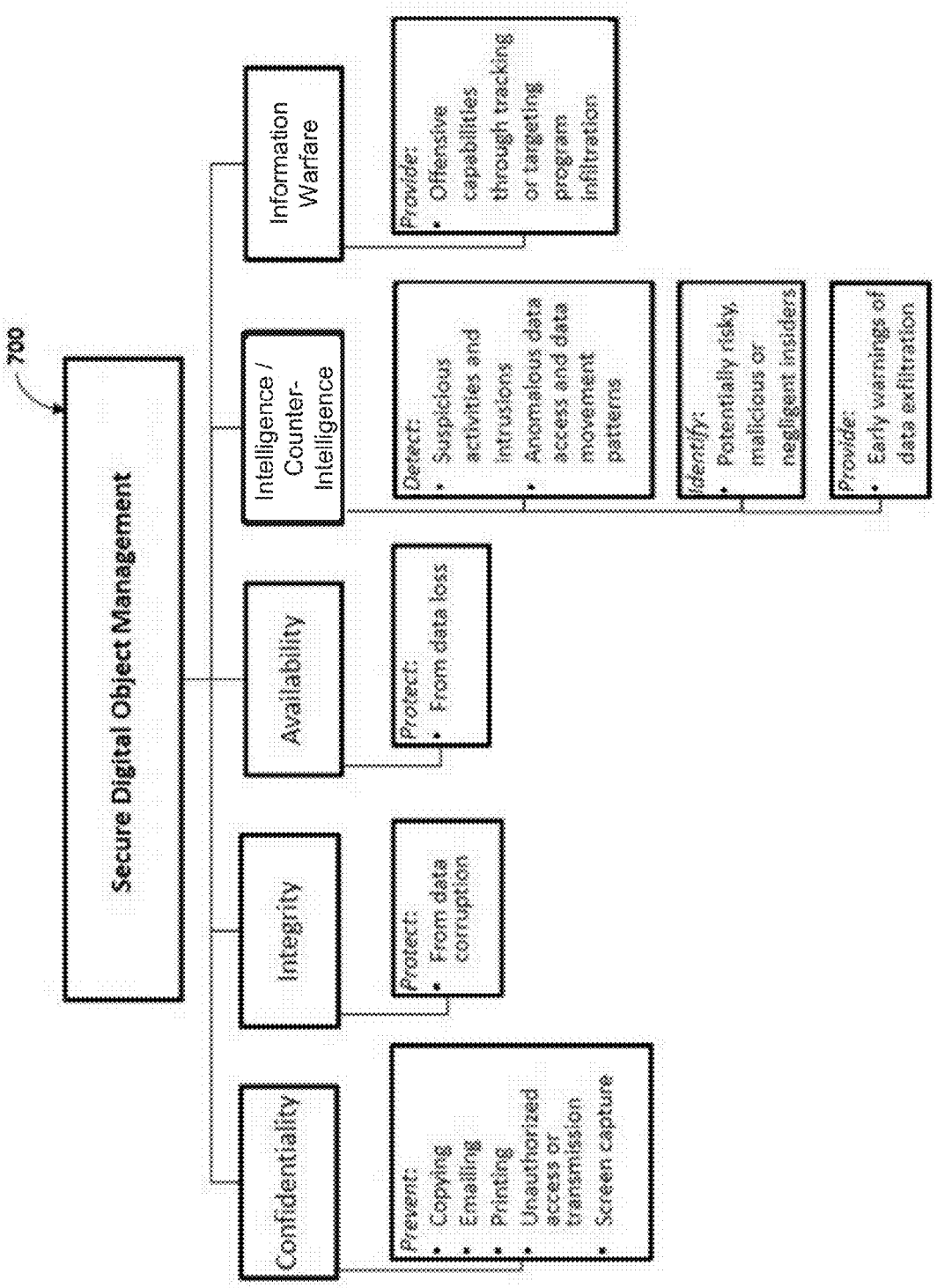
FIG. 11 is a block diagram illustrating exemplary operational scenarios for a secure digital object management system according to an embodiment of the present invention.

Referring now to FIG. 11, exemplary advantageous scenarios for the present invention are described in detail. For each scenario, the related security measures in the present invention are listed. These scenarios may hinge on advancing confidentiality, integrity and availability of information, and also on providing intelligence/counter-intelligence/information warfare (both defensive and offensive) capabilities.

Confidentiality measures in the present invention may advantageously protect sensitive information so that such information does not reach unauthorized parties. The following scenarios are related to confidentiality:

a) Prevent copying of digital objects to USB drive: A secure container's 104 file system 210 may be isolated from local machine's 102 file system 216. Digital objects 212 may not be copied/moved from the secure container 104 to the local machine 102. Applications on a local machine 102 may access and update the digital objects 212 through the proxy or agent 200 in the secure container 104. The digital objects 212 in a secure container 104 may be tethered (through two-way connections) 106 to the host environment 100 and may only be operated on by a user in the presence of active tethers 106.

b) Prevent uploading digital objects to cloud storage or FTP server: Port blocking may be executed on the secure container 104 to disable any form of internet access (browsing, emails, FTP) to prevent leaks (i.e., unauthorized dissemination of information as a result of intentional or unintentional acts or omissions). The only enabled internet or network connection may be between the secure container 104 and the host environment 100 in the cloud.

c) Prevent emailing of digital objects to third parties: Port blocking by the secure container 104 may prevent the digital objects 212 from being emailed to third parties.

d) Prevent copying of digital objects contents to another artifact (e.g., document or email): Clipboard sharing between local machine 102 and secure container 104 may be blocked. New digital objects 212 may be created within the secure container 104 only through the host 100.

e) Prevent unauthorized access and transmission of digital objects: A user may access only those digital objects 212 for which the user has permissions. Shared digital objects 212 may self-destruct when their tether(s) 106 become inactive. Digital objects 212 may only be operated on by a user or an application in the presence of active tethers 106. In the absence of active tethers 106 (e.g., state value of tether 106 is inactive), the digital objects 212 within the local secure container 104 may self-destruct after a timeout period. This capability may apply to any closed intranet system that does not communicate (and is not supposed to communicate) with any other system, and may address both internal and external attempts to illicitly transmit information.

f) Prevent screen capturing of documents: Screen captures may be discouraged by the secure container 104 overlaying a dynamic watermarking layer over the rendering application 214 (e.g. a moving watermark over the screen that contains user ID, name, etc.)

g) Prevent printing of documents: Port blocking and disabling spoolers by secure containers 104 may prevent printing of digital object 212 contents.

Integrity measures in the present invention may advantageously keep digitally-stored information accurate and reliable and prevent the information from being tampered or changed by unauthorized parties. The following scenario may be related to integrity:

a) Protect digital objects from being corrupted or updated by unauthorized, malicious or negligent users: The integrity of digital objects 212 may be protected by the use of tethers 106 and the document management service 116 of the cloud-based host environment 100. Authorized users may access and work on the digital objects 212 only when active tether connections 106 are present between the digital objects 212 and the host 100. Digital objects 120 may be securely saved on the host 100 and also replicated. Digital object versioning may be done within the host 100 so that multiple versions of the same digital object 120, 212 may be stored.

Availability measures in the present invention may advantageously ensure that the digitally-stored information is available to authorized parties when needed. The following scenario may be related to availability:

a) Protect digital objects from being deleted: In addition to stealing information, an insider or outsider may also seek to destroy information. Digital objects 212 may be replicated 120 on the cloud-based host environment 100 using the document management service 116. Such replication may minimize a bad actor's ability to destroy information.

Intelligence/counter-intelligence/information warfare measures in the present invention may advantageously collect and analyze information to detect suspicious activities and identify malicious insiders and/or external threats. Such measures also may advantageously gather information about an adversary through lawful injection of tracking or targeting programs on the adversary's systems. The following scenarios may be related to intelligence, counter-intelligence and information warfare:

a) Detect suspicious activities and intrusions: The access monitoring component 204 in a secure container 104 logs all object 212 accesses and reports to the analytics engine 114 in the cloud 100 through the tether connections 106. The cloud-based host environment 100 may employ big data analytics capabilities to analyze object access and detect any suspicious activities or intrusions.

b) Detect anomalous data access and data movement patterns: The host 100 may include analytics that may identify any behavior considered "anomalous". Such behavior may include cutting and pasting large portions of files, copying large numbers of files, or any other behavior that may give rise to suspicion. The system may be flexible so that new analytics may be added or tweaked as intelligence or security officers identify new conduct that should be deemed anomalous or set different thresholds for what constitutes such behavior. When an anomaly occurs, the intelligence or security officer may be alerted and may then determine whether the conduct merits a follow-up investigation.

c) Identify potentially risky, malicious or negligent insiders: The big data analytics capabilities of the analytics and reporting engine 114 of the host 100 may be leveraged to identify potentially risky, malicious or negligent insiders. For each user, the system may compute a risk-score by analysis of the user's data access patterns and other behavior. Intelligence, counter-intelligence, or security officers may keep a strict vigil on the risky users so that corrective actions may be taken in a timely manner to prevent leaks.

d) Provide early warnings of data exfiltration: Any attempts for data exfiltration to unauthorized third parties may be identified by the analytics and reporting engine 114 of the host 100 through analysis of object access logs 122 and network traffic.

e) Provide offensive capabilities where intentional data leaks may be permitted to inject tracking or targeting programs on adversary systems: In certain circumstances (e.g., for the purposes of governments authorized by law to conduct such operations in accordance with applicable law such as, for example, and without limitation, pursuant to authorities in Title 10 (US Military activities) or Title 50 (US Intelligence Community activities), an agency may wish to permit the otherwise illicit transfer of certain files to clandestinely or covertly insert offensive, targeting or tracking programs on an adversary's systems. The document management service 116 of the cloud-based host 100 may provide such capability, which may include cyber weapons capability and/or an ability to collect data for law enforcement purposes (e.g., identify external threats). This is the manifestation of big-data analytics coupled with intelligence and counter-intelligence tradecraft, and information warfare doctrine.

Figure 12:
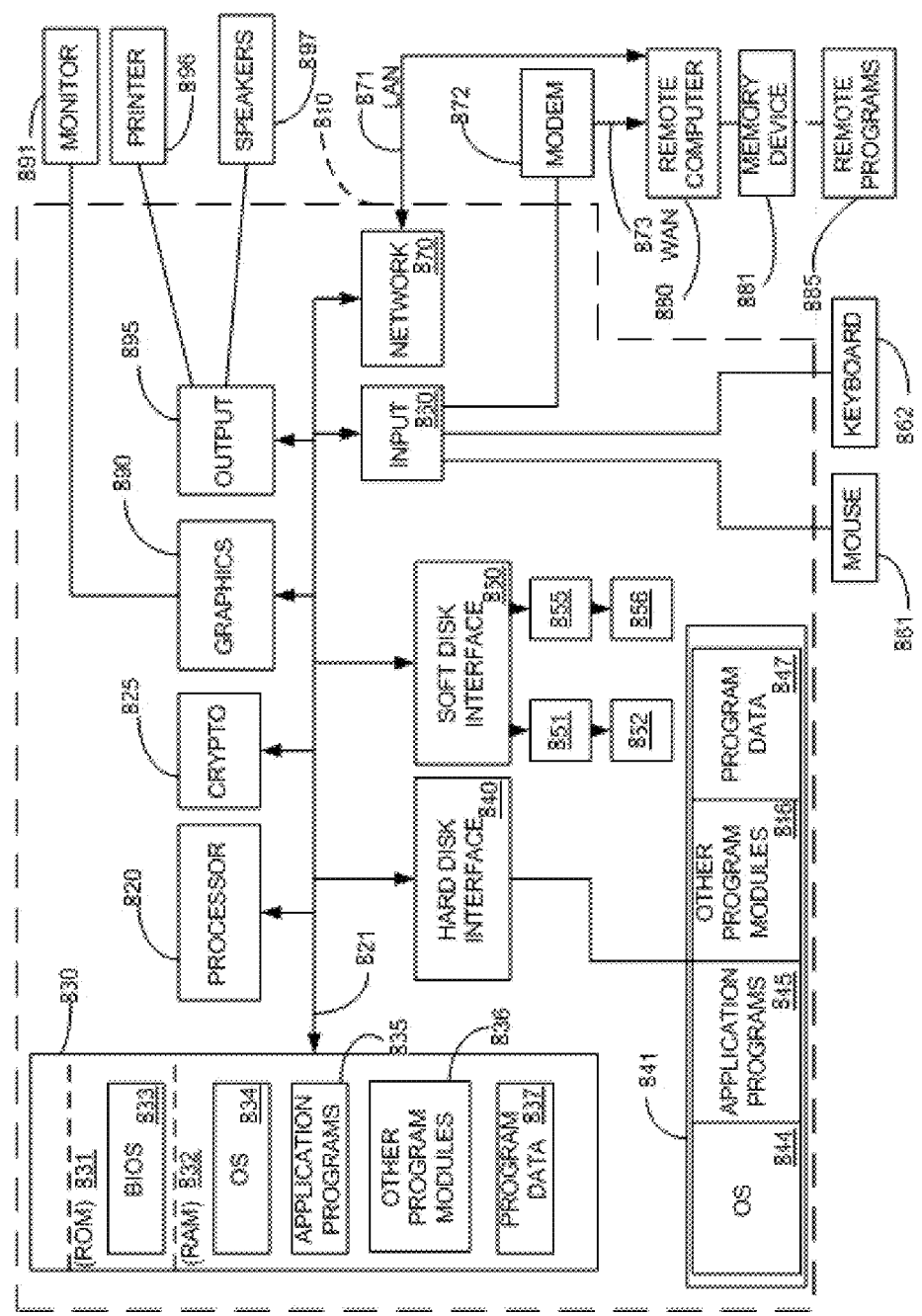
FIG. 12 is a block diagram representation of a machine in the example form of a computer system according to an embodiment of the present invention.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 12 illustrates a model computing device in the form of a computer 810 which is capable of performing one or more computer-implemented steps in practicing the method aspects of the present invention. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 810 may also include a cryptographic unit 825. Briefly, the cryptographic unit 825 has a calculation function that may be used to verify digital signatures, calculate hashes, digitally sign hash values, and encrypt or decrypt data. The cryptographic unit 825 may also have a protected memory for storing keys and other secret data. In other embodiments, the functions of the cryptographic unit may be instantiated in software and run via the operating system.

A computer 810 typically includes a variety of computer readable media, Computer readable media can be any available media that can be accessed by a computer 810 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates an operating system (OS) 834, application programs 835, other program modules 836, and program data 837.

The computer 810 may also include other removable/non-removable, volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives, and their associated computer storage media discussed above and illustrated in FIG. 12, provide storage of computer readable instructions, data structures, program modules and other data for the computer 810. In FIG. 12, for example, hard disk drive 841 is illustrated as storing an OS 844, application programs 845, other program modules 846, and program data 847. Note that these components can either be the same as or different from OS 833, application programs 833, other program modules 836, and program data 837. The OS 844, application programs 845, other program modules 846, and program data 847 are given different numbers here to illustrate that, at a minimum, they may be different copies. A user may enter commands and information into the computer 810 through input devices such as a keyboard 862 and cursor control device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a graphics controller 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 12. The logical connections depicted in FIG. 12 include a local area network (LAN) 871 and a wide area network (WAN) 873, but may also include other networks 140. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation. FIG. 12 illustrates remote application programs 885 as residing on memory device 881.

The communications connections 870 and 872 allow the device to communicate with other devices. The communications connections 870 and 872 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Those skilled in the art will appreciate that the present invention contemplates the use of data structures that may store information supporting any or all of the operations involved in inventory management. The disclosure of the exemplary data structures above is not meant to be limiting in any way. Those skilled in the art will readily appreciate that data structures may include any number of additional or alternative real world data sources, and may be configured in any way while still accomplishing the many goals, features and advantages according to the present invention, Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method for securing digital objects using a secure data object management system comprising a host device in a cloud-based host environment and a secure container in a local machine, each operable on a respective computing device comprising a processor device and a non-transitory computer-readable storage medium accessible through the processor device, wherein the non-transitory computer-readable storage media comprise a plurality of instructions which, when executed by the processor device, perform the method comprising:
   performing, by the host device in the cloud-based host environment, operations comprising:
   creating a master digital object at the host device,
   creating a controlled digital object from the master digital object, and
   creating, by the host device, a tether associated with the controlled digital object between the host device and the secure container of the local machine, including a state value equal to active, a tether identifier, and at least one control condition comprising an access permission; and
   performing, by a proxy in the secure container of the local machine, operations comprising:
   receiving the controlled digital object from the host device in the cloud-based host environment,
   receiving an access request, at the local machine, directed to the controlled digital object, permitting, upon detection of the access request satisfying the access permission of the active tether, access to the controlled digital object, and
   storing, by the proxy of the secure container, meta-data associated with the access request to the tether associated with the controlled digital object in the local machine.

2. The method according to claim 1 wherein creating the controlled digital object from the master digital object further comprises duplicating some portion of the master digital object as some portion of the controlled digital object.

3. The method according to claim 1 wherein the at least one control condition further comprises an operation permission selected from the group consisting of a view permission, a delete permission, a store permission, an edit permission, and a copy permission.

4. The method according to claim 3 further comprising performing, using the secure container, operations including:
   receiving an operation request directed to the controlled digital object; and
   permitting, upon detection of the state value of the tether equaling active and of the operation request satisfying the operation permission, manipulation of the controlled digital object as defined by the operation request.

5. The method according to claim 4 further comprising performing, using the secure container, operations including storing meta-data associated with the operation request to the tether associated with the controlled digital object.

6. The method according to claim 5 further comprising performing, using the cloud-based host environment, operations including:
   detecting an anomalous data access pattern in the respective meta-data of at least one of the access request and the operation request; and
   setting the state value of the tether equal to inactive.

7. The method according to claim 6 further comprising performing, using the cloud-based host environment, operations including storing the meta-data associated with the operation request to a meta-database.

8. The method according to claim 7 further comprising performing, using the cloud-based host environment, operations including modifying the at least one control condition associated with the controlled data object based on analysis of the meta-data associated with the controlled data object as stored in the meta-database.

9. The method according to claim 1 wherein the at least one control condition further comprises a command selected from the group consisting of a timeout command and a destroy command.

10. The method according to claim 9 further comprising performing, using the secure container, operations including, upon detection of a timeout period satisfying the timeout command, deleting the controlled digital object.

11. The method according to claim 1 further comprising performing, using the secure container, operations including rejecting, upon detection of the access request failing the access permission, access to the controlled digital object.

12. The method according to claim 1 further comprising performing, using the secure container, operations including rejecting, upon detection of the state value of the tether equal to inactive, access to the controlled digital object.

13. The method according to claim 12 further comprising performing, using the secure container, operations including, upon detection of the state value of the tether equal to inactive, rejecting an operation request directed to the controlled digital object and performing an alternative command.

14. The method according to claim 1 further comprising performing, using the cloud-based host environment, operations including creating a plurality of controlled digital objects, including the controlled digital object, from the master digital object and creating the tether associated with the plurality of controlled digital objects, and including the state value, the tether identifier, and the at least one control condition.

15. The method according to claim 1 further comprising performing, using the cloud-based host environment, operations including creating a plurality of controlled digital objects, including the controlled digital object, from the master digital object and creating a plurality of tethers, including the tether, each associated with a respective one of the plurality of controlled digital objects.

16. A secure data object management system comprising:
a host device in a cloud-based host environment configured to:
create a master digital object at the host device,
create a controlled digital object from the master digital object, and
create, by the host device, a tether associated with the controlled digital object between the host device and a secure container of a local machine, including a state value equal to active, a tether identifier, and at least one control condition comprising an access permission; and
a proxy of a secure container in the local machine configured to:
receive the controlled digital object from the host device in the cloud-based host environment,
receive an access request, at the local machine, directed to the controlled digital object,
permit, upon detection of the access request satisfying the access permission of the active tether, access to the controlled digital object, and
store, by the proxy of the secure container, meta-data associated with the access request to the tether associated with the controlled digital object in the local machine.

17. The system according to claim 16 wherein the cloud-based host environment is further configured to duplicate some portion of the master digital object to define some portion of the controlled digital object.

18. The system according to claim 16 wherein the at least one control condition further comprises an operation permission selected from the group consisting of a view permission, a delete permission, a store permission, an edit permission, and a copy permission.

19. The system according to claim 18 wherein the secure container is further configured to:
receive an operation request directed to the controlled digital object; and
permit, upon detection of the state value of the tether equaling active and of the operation request satisfying the operation permission, manipulation of the controlled digital object as defined by the operation request.

20. The system according to claim 19 wherein the secure container is further configured to store meta-data associated with the operation request to the tether associated with the controlled digital object.

21. The system according to claim 20 wherein the cloud-based host environment is further configured to detect an anomalous data access pattern comprising at least one of the access request and the operation request, and set the state value of the tether equal to inactive.

22. The system according to claim 21 wherein the cloud-based host environment is further configured to store the meta-data associated with the operation request to a meta-database.

23. The system according to claim 22 wherein the cloud-based host environment is further configured to compute a risk score for the meta-data associated with the controlled data object as stored in the meta-database, and to modify the at least one control condition associated with the controlled data object based on the risk score.

24. The system according to claim 16 wherein the at least one control condition further comprises a command selected from the group consisting of a timeout command and a destroy command.

25. The system according to claim 24 wherein the secure container is further configured, upon detection of a timeout period satisfying the timeout command, delete the controlled digital object.

26. The system according to claim 16 wherein the secure container is further configured to reject, upon detection of the access request failing the access permission, access to the controlled digital object.

27. The system according to claim 16 wherein the secure container is further configured to reject, upon detection of the state value of the tether equal to inactive, access to the controlled digital object.

28. The system according to claim 27 wherein the secure container is further configured, upon detection of the state value of the tether equal to inactive, to reject an operation request directed to the controlled digital object and to perform an alternative command.

29. The system according to claim 16 wherein the cloud-based host environment is further configured to create a plurality of controlled digital objects, including the controlled digital object, from the master digital object and to create the tether associated with the plurality of controlled digital objects, and including the state value, the tether identifier, and the at least one control condition.

30. The system according to claim 16 wherein the cloud-based host environment is further configured to create a plurality of controlled digital objects, including the controlled digital object, from the master digital object and to create a plurality of tethers, including the tether, each associated with a respective one of the plurality of controlled digital objects.

* * * * *